United States Patent
Corbeels et al.

(10) Patent No.: US 6,445,996 B1
(45) Date of Patent: Sep. 3, 2002

(54) METHOD AND SYSTEM FOR DYNAMICALLY ESTIMATING ATMOSPHERIC AIR PRESSURE AMBIENT TO AN INTERNAL COMBUSTION ENGINE

(75) Inventors: Carol L. Corbeels; Eric A. Holloway, both of Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/470,531

(22) Filed: Dec. 22, 1999

(51) Int. Cl.$^7$ .............................................. F02D 41/02
(52) U.S. Cl. ...................... 701/104; 701/115; 73/117.3
(58) Field of Search ................................ 123/357, 478, 123/480; 701/102, 104, 115; 73/115, 116, 117.2, 117.3

(56) References Cited

U.S. PATENT DOCUMENTS

| | | | |
|---|---|---|---|
| 4,703,625 A | 11/1987 | Caldwell | 60/602 |
| 4,926,335 A | * 5/1990 | Flowers et al. | 701/102 |
| 4,938,195 A | * 7/1990 | Miyazaki et al. | 123/488 |
| 4,962,663 A | 10/1990 | Mitani | 73/115 |
| 5,086,667 A | 2/1992 | Katayama et al. | 74/860 |
| 5,590,632 A | 1/1997 | Kato et al. | 123/480 |
| 5,615,657 A | 4/1997 | Yoshizawa | 123/494 |

FOREIGN PATENT DOCUMENTS

| | | | | |
|---|---|---|---|---|
| JP | 61-205832 | | 9/1986 | |
| JP | 3-164551 | * | 7/1991 | 123/559.1 |
| JP | 4-164132 | * | 6/1992 | F02B/37/10 |

* cited by examiner

Primary Examiner—Andrew M. Dolinar
(74) Attorney, Agent, or Firm—Woodard, Emhardt, Naughton Moriarty & McNett

(57) ABSTRACT

A system for executing a method for estimating atmospheric air pressure ambient to an internal combustion engine as a means to preclude the need for an atmospheric air pressure sensor. The system includes an absolute boost pressure sensor, an engine speed sensor, and an electronic control unit. The absolute boost pressure sensor provides a first signal that is indicative of the absolute boost pressure of the air received within the intake manifold of the engine. The engine speed sensor provides a second signal that is indicative of the engine speed of the engine. The electronic control unit generates a third signal that is indicative of the atmospheric air pressure ambient to the engine, a fourth signal that is indicative of a gage boost pressure of the engine, and a fifth signal that is indicative of a fuel command for the engine. When the engine is idling, the atmospheric air pressure signal is generated as a function of the absolute boost pressure signal. When the engine is running in a steady state, the gage boost pressure signal is generated as a function of the engine speed signal and the fuel command signal, and the atmospheric air pressure signal is generated as a function of the absolute boost pressure signal and the gage boost pressure signal. Alternatively, the system can further include a controller for synonymously generating the atmospheric air pressure signal and the gage boost pressure signal, and for providing these signals to the electronic control unit.

37 Claims, 9 Drawing Sheets

METHOD AND SYSTEM FOR DYNAMICALLY ESTIMATING ATMOSPHERIC AIR PRESSURE AMBIENT TO AN INTERNAL COMBUSTION ENGINE

TECHNICAL FIELD OF THE INVENTION

The present invention generally relates to a method and a system for dynamically estimating atmospheric air pressure ambient to an internal combustion engine. The present invention more specifically relates to a control system for executing a method for dynamically estimating atmospheric air pressure ambient to an internal combustion engine in response to various signals relating to the internal combustion engine.

BACKGROUND OF THE INVENTION

To strive for optimum engine performance, a control system for an internal combustion engine estimates an optimum quantity of fuel injection into a combustion chamber for each combustion cycle of the engine as a function of various operating and environmental conditions of the engine and associated vehicle. Atmospheric air pressure ambient to the internal combustion engine is one of the environmental conditions that must be considered during this process for several reasons. First, the quantity of fuel required to start an internal combustion engine at sea level is significantly higher than the quantity of fuel required to start the engine at high altitudes. Consequently, if the quantity of fuel required to start the internal combustion engine is fixed as a function of atmospheric air pressure at sea level, then fuel is wasted when the engine is started at high altitudes. Conversely, if the quantity of fuel required to start the internal combustion engine is fixed as a function of atmospheric air pressure at high altitudes, then the quantity of starting fuel may be insufficient to start the engine at sea level. Unfortunately, if the quantity of fuel required to start the internal combustion engine is fixed as a function of atmospheric air pressure at an intermediate altitude, then fuel will still be wasted when the engine is started at high altitudes and the quantity of starting fuel may still be insufficient to start the engine when the engine is at sea level. In addition, the internal combustion engine will experience excessive black smoke while operating at low boost levels when the engine is at high altitudes.

Second, aggressive fuel timing advances for the internal combustion engine are required to control white smoke levels from the engine when the engine is at high altitudes. However, if aggressive fuel timing advances are implemented at all altitudes, the internal combustion engine will experience significantly high levels of noise when the engine is at sea level. Finally, there is also the need to derate the fuel parameters of the internal combustion engine when the engine is at high altitudes to protect engine components from significant wear and tear. Consequently, if the fuel parameters of the internal combustion engine are fixed as a function of atmospheric air pressure at sea level or an intermediate altitude, then the repair and maintenance cost of an internal combustion engine predominately at high altitudes will significantly exceed the repair and maintenance cost of an internal combustion engine predominately at sea level.

A solution known in the art for dynamically determining atmospheric air pressure ambient to an internal combustion engine is the addition of an atmospheric air pressure sensor positioned within a passenger compartment of a vehicle. An electronic control unit receives a signal from the atmospheric air pressure sensor and determines the proper amount of fuel injection into a combustion chamber for each combustion cycle of the engine as a function of the atmospheric air pressure signal. A problem associated with this solution is the added expense of having an additional sensor and the associated wiring as well as any additional repair and/or replacement costs attributed to the atmospheric air pressure sensor. Another problem is the requirement for an additional input signal path to the electronic control unit that decreases the reliability of the electronic control unit by increasing the number of potential failure points leading to the electronic control unit. Thus, the cost of monitoring and testing the atmospheric air pressure sensor and the associated input signal path is also incurred.

A solution known in the art for estimating atmospheric air pressure ambient to an internal combustion engine is the utilization of a signal from a boost sensor positioned within a suction pipe of the engine to detect the pressure downstream from a throttle valve also positioned within the suction pipe. The boost sensor signal is sinusoidal due to the cyclical opening and closing of the throttle valve. Atmospheric air pressure ambient to the engine is estimated as a function of the maximum ripple value of the boost sensor signal immediately after the engine is started. However, this estimation method is not dynamic since it is not executed when the engine is running. Alternatively, atmospheric air pressure ambient to the engine is estimated as a function of the average value of the boost sensor signal as the engine is running. However, this estimation method is not dynamic since it is not executed at least once for each combustion cycle of the internal combustion engine.

In view of the foregoing issues, there is a need for dynamically estimating atmospheric air pressure ambient to an internal combustion engine. The present invention satisfies these needs in a novel and unobvious manner.

SUMMARY OF THE INVENTION

The foregoing shortcomings of the prior art are addressed by the present invention. In one aspect of the present invention, a method for estimating atmospheric air pressure ambient to an internal combustion engine comprises a first step of estimating the atmospheric air pressure as a function of the absolute boost pressure of the internal combustion engine when the internal combustion engine is idling, and a second step of estimating the atmospheric air pressure as a function of both the absolute boost pressure and the engine speed of the internal combustion engine when the internal combustion engine is running in a steady state.

In a second aspect of the present invention, a system for estimating atmospheric air pressure ambient to an internal combustion engine comprises a means for estimating the atmospheric air pressure as a function of the absolute boost pressure of the internal combustion engine when the internal combustion engine is idling, and a means for estimating the atmospheric air pressure as a function of both the absolute boost pressure and the engine speed of the internal combustion engine when the internal combustion engine is running in a steady state.

One object of the present invention is to provide a method for dynamically estimating atmospheric air pressure ambient to an internal combustion engine.

Another object of the present invention is to provide a system for executing a method for dynamically estimating atmospheric air pressure ambient to an internal combustion engine.

These and other objects of the present invention will become more apparent from the following description of the preferred embodiment.

DESCRIPTION OF THE PREFERRED EMBODIMENT

Figure 1:
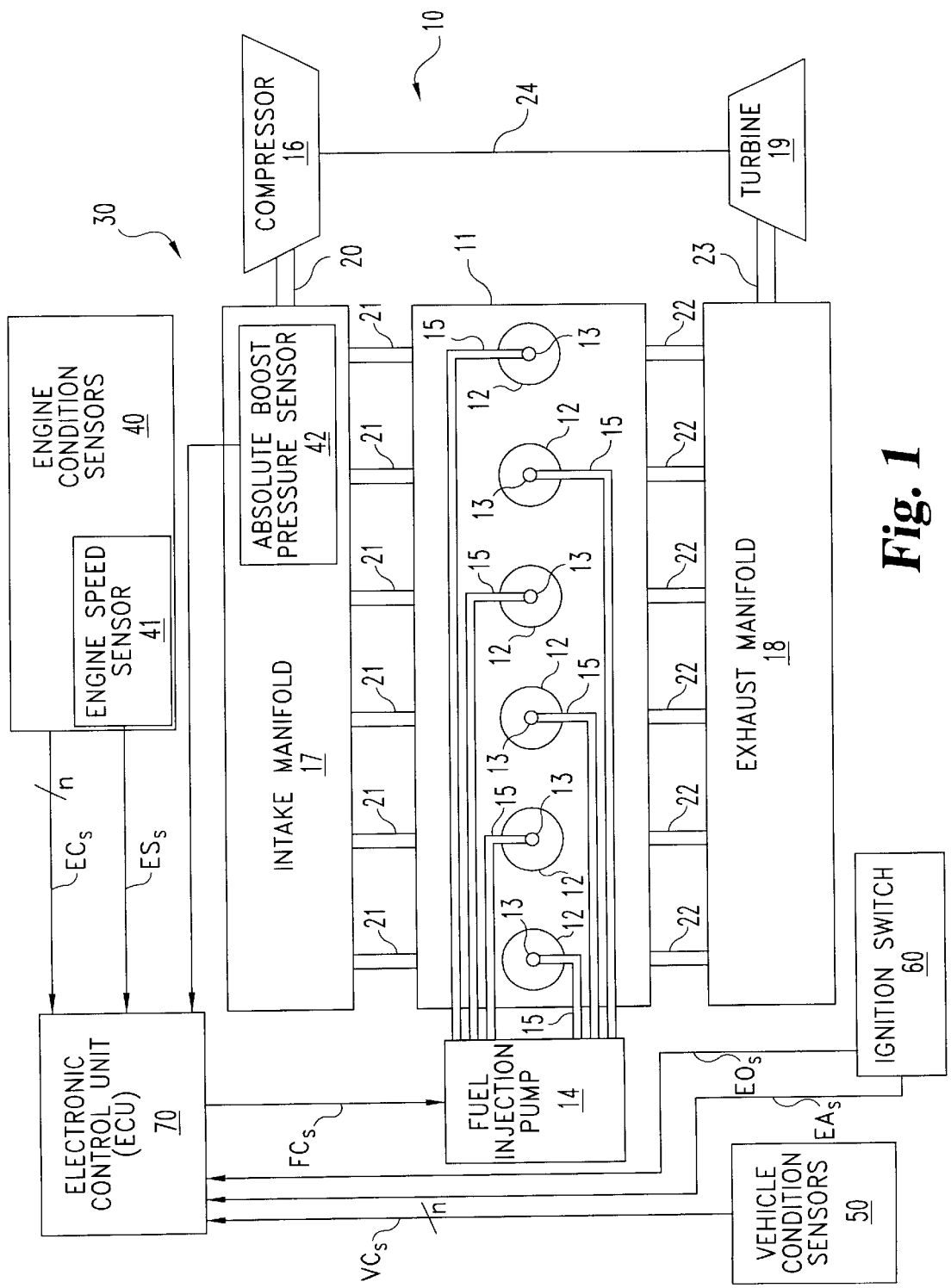
FIG. 1 is a diagrammatic illustration of one embodiment of a system for dynamically estimating atmospheric air pressure ambient to an internal combustion engine in accordance with the present invention.

For the purposes of promoting an understanding of the principles of the present invention, reference will now be made to the embodiments illustrated in the drawings and specific language will be used to describe the same. It will nevertheless be understood that no limitation of the scope of the present invention is thereby intended, such alterations and further modifications in the illustrated devices, and such further applications of the principles of the present invention as illustrated therein being contemplated as would normally occur to one skilled in the art to which the present invention relates.

Referring now to FIG. 1, an internal combustion engine 10 (hereinafter "engine 10") is shown. Internal combustion engines are well known in the art of the present invention. Therefore, the present description of engine 10 is directed to the primary components of engine 10 directly associated with an execution of a method for dynamically estimating atmospheric air pressure ambient to engine 10 for every combustion cycle of engine 10 in accordance with the present invention. It is to be understood that components of engine 10, described and not described, can have any structural configuration well known in the art of the present invention. Engine 10 primarily includes an engine block 11 having six (6) combustion chambers 12 partially formed therein, a fuel injector 13 for each combustion chamber 12, and a fuel injection pump 14. It is to be understood that the actual number of combustion chambers 12 can be one or more, and that the selected number of combustion chambers 12 is determined in accordance with the general practice of the art of the present invention based on engine size and style. Six (6) fuel lines 15 establish fluid communication between fuel injection pump 14 and a respective fuel injector 13. During each combustion cycle of engine 10, fuel from fuel injection pump 14 is injected into one of the combustion chambers 12 by an associated fuel injector 13. Each of the combustion chambers 12 receives fuel once every six (6) combustion cycles of engine 10, for a six-cylinder engine.

Engine 10 further includes a compressor 16, an intake manifold 17, an exhaust manifold 18, and a turbine 19. An air intake pathway 20 establishes fluid communication between compressor 16 and intake manifold 17. Those skilled in the art of the present invention will recognize that additional components can be positioned along air intake pathway 20 between compressor 16 and intake manifold 17, e.g. an after cooler. Six (6) air intake pathways 21 establish fluid communication between intake manifold 17 and a respective combustion chamber 12. During each combustion cycle of engine 10, one of the combustion chambers 12 receives air supplied to intake manifold 17 from compressor 16. Each of the combustion chambers 12 receives air once every six (6) combustion cycles of engine 10. Six (6) air exhaust pathways 22 establish fluid communication between combustion chambers 12 and exhaust manifold 18. An air exhaust pathway 23 establishes fluid communication between exhaust manifold 18 and turbine 19. During each combustion cycle of engine 10, exhaust gas from one of the combustion chambers 12 flows through exhaust manifold 18 into turbine 19. Each of the combustion chambers 12 provides exhaust gas to turbine 19 once every six (6) combustion cycles of engine 10. A linkage 24 mechanically couples turbine 19 to compressor 16. The exhaust gas from combustion chambers 12 drives turbine 19, and turbine 19 in turn drives compressor 16.

Still referring to FIG. 1, one embodiment of a system 30 for executing a method for dynamically estimating atmospheric air pressure ambient to engine 10 for each combustion cycle of engine 10 in accordance with the present invention is shown. System 30 primarily comprises a plurality of engine condition sensors 40, a plurality of vehicle condition sensors 50, ignition switch 60, and electronic control unit 70 (hereinafter "ECU 70"). Engine condition sensors 40 are well known in the art for providing a plurality of engine condition signals $EC_S$ that are indicative of operative and environmental conditions of engine 10. Examples of engine conditions sensors 40 not individually shown include an air-intake temperature sensor, an engine coolant temperature sensor, and an oxygen sensor.

Engine speed sensor 41 and absolute boost pressure sensor 42 are engine condition sensors 40 that are individually shown due to their significant role in the execution of a method for estimating atmospheric air pressure ambient to engine 10. Engine speed sensor 41 is of known construction and is positioned with respect to a rotational component of engine 10, e.g. a drive shaft. Engine speed sensor 41 provides an engine speed signal $ES_S$ that is indicative of the rotational speed of the rotational component. Absolute boost pressure sensor 42 is positioned within intake manifold 17 adjacent air intake pathway 20. Absolute boost pressure sensor 42 provides an absolute boost pressure signal $ABP_S$ that is indicative of the pressure of the air within intake manifold 17.

Vehicle condition sensors 50 are well known in the art for providing a plurality of vehicle condition signals $VC_S$ that are indicative of operative and environmental conditions associated with the vehicle housing engine 10. An example of a vehicle condition sensor 50 not individually shown is a throttle position sensor. Ignition switch 60 is of known construction and provides an engine activation signal $EA_S$ that is indicative of a key being placed in the ON position of ignition switch 60. Ignition switch 60 further provides an engine ON signal $EO_S$ that is indicative of a key being placed within the START position of ignition switch 60. ECU 70 executes an engine operation routine 80 as will be described in greater detail in connection with FIG. 3 and an atmospheric air pressure estimation routine 90 as will be described in greater detail in connection with FIG. 4. The present invention contemplates that ECU 70 can include digital circuitry, analog circuitry, or both. The present invention further contemplates that ECU 70 can be a main control unit, or an auxiliary control unit.

Figure 2:
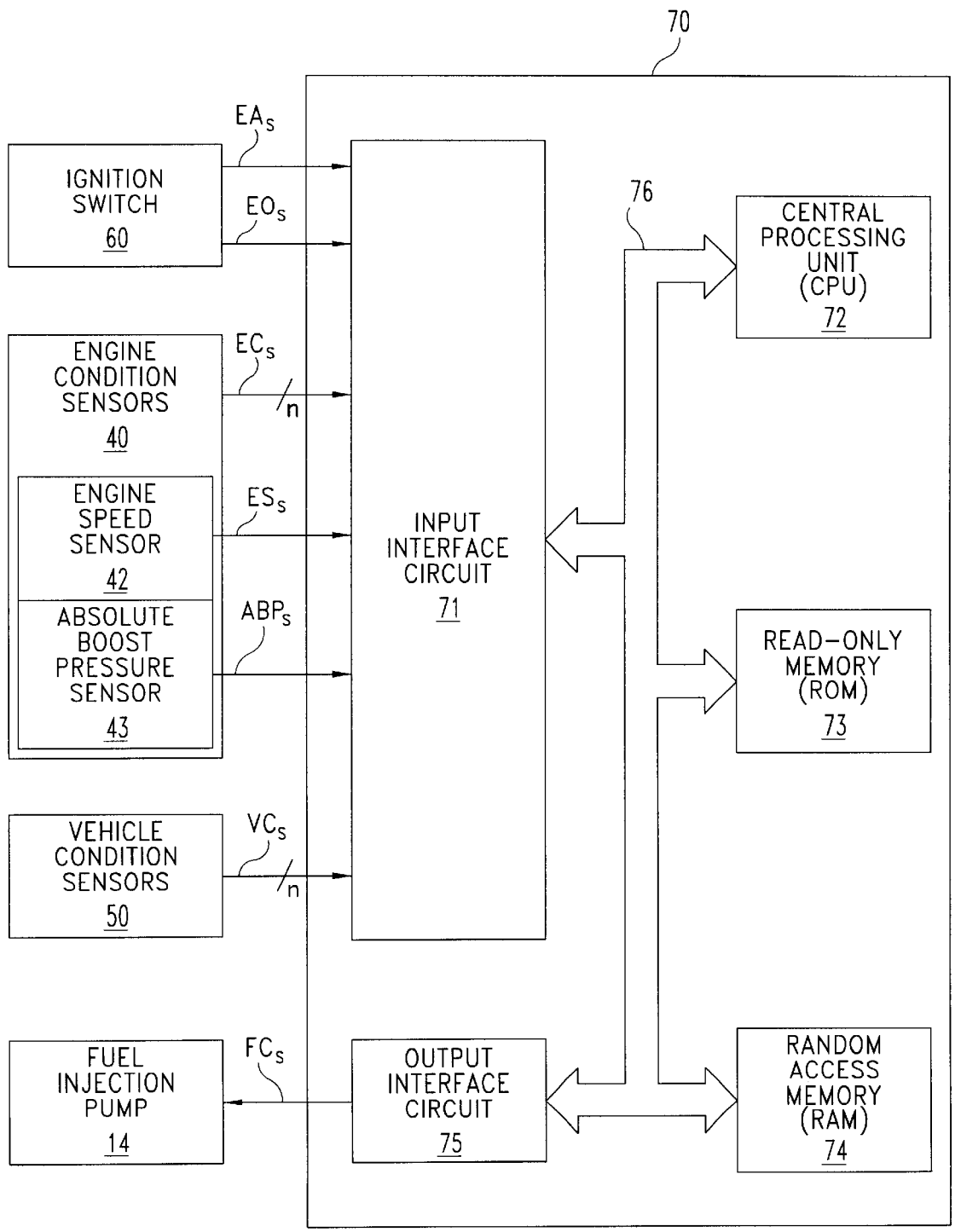
FIG. 2 is a diagrammatic illustration of one embodiment of an electronic control unit of the FIG. 1 system.

Referring to FIG. 2, ECU 70 preferably includes an input interface circuit 71, a central processing unit 72 (hereinafter "CPU 72"), a read-only memory 73 (hereinafter "ROM 73"), a random-access memory 74 (hereinafter "RAM 74"), and an output interface circuit 75. Input interface circuit 71, CPU 72, ROM 73, RAM 74, and output interface circuit 75 are of known construction, and are electrically coupled by a bus 76. Input interface circuit 71 is electrically coupled to engine condition sensors 40, engine speed sensor 41, absolute boost pressure sensor 42, vehicle condition sensors 50, and ignition switch 60 to receive engine condition signals $EC_S$, engine speed signal $ES_S$, absolute boost pressure signal $ABP_S$, vehicle condition signals $VC_S$, engine activation signal $EA_S$, and engine ON signal $EO_S$, respectively. The present invention contemplates that input interface circuit 71 is constructed to transform and/or modify the signals as needed, e.g. analog-to-digital conversion, amplification, attenuation, filtration, wave shaping, etc. RAM 74 temporarily stores any received signal. Various routines including engine operation routine 80 (FIG. 3) and atmospheric air pressure estimation routine 90 (FIG. 4) as well as any baseline data related to engine 10 and any vehicle housing engine 10 are stored in ROM 73. CPU 72 executes the stored routines to generate and provide various signals such as a fuel command signal $FC_S$ as shown. RAM 74 temporarily stores each signal generated by CPU 72. Output interface circuit 75 provides the signals to various components of engine 10 such as providing fuel command signal $FC_S$ to fuel injection pump 14 as shown. The present invention contemplates output interface circuit 75 is constructed to transform and/or modify the signals as needed.

Figure 3:
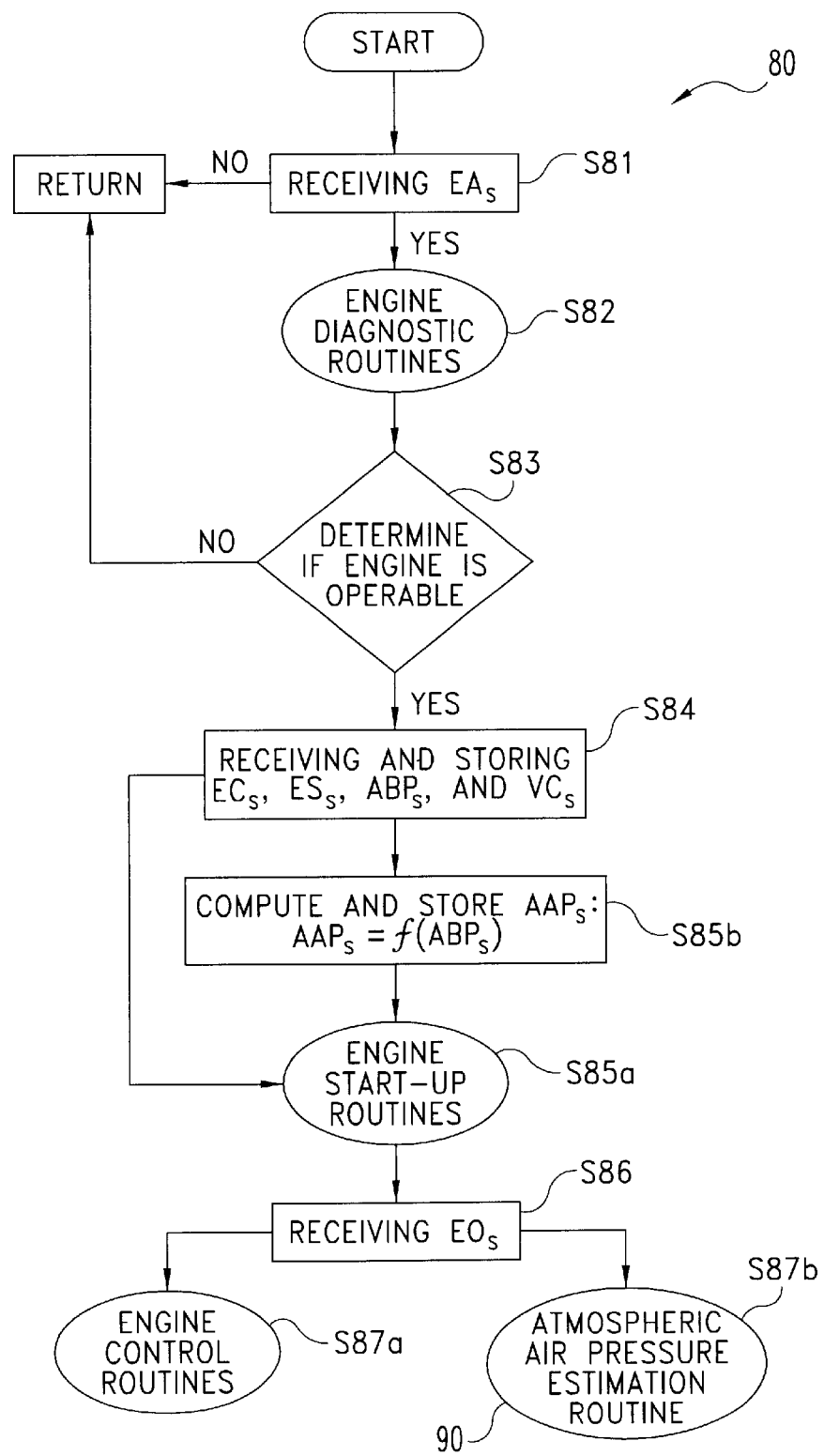
FIG. 3 is a flow chart illustrating one embodiment of an engine operation routine in accordance with the present invention for the FIGS. 1 and 2 electronic control unit.

Referring to FIG. 3, an execution of engine operation routine 80 by ECU 70 will now be described. In step S81 of FIG. 3, CPU 72 receives engine activation signal $EA_S$ via interface input circuit 71. The remaining steps of engine operation routine 80 are sequentially executed therefrom during the time interval that CPU 72 receives engine activation signal $EA_S$. Thus, engine operation routine 80 terminates upon a cessation of CPU 72 receiving engine activation signal $EA_S$. In step S82 of FIG. 3, CPU 72 initiates engine diagnostic routines as known in the art. In step S83 of FIG. 3, CPU 72 determines if engine 10 is capable of being started and operated based upon the immediate and continued results of the engine diagnostic routines. If the collective results of the engine diagnostic routines are ever negative during the receipt of engine activation signal $EA_S$, then CPU 72 will terminate engine operation routine 80. If the collective results of the engine diagnostic routines are always positive during the receipt of engine activation signal $EA_S$, then CPU 72 proceeds to the remaining steps of engine operation routine 80. In step S84 of FIG. 3, for each clock cycle of CPU 72, CPU 72 receives engine condition signals $EC_S$, engine speed signal $ES_S$, absolute boost pressure signal $ABP_S$, and vehicle condition signals $VC_S$ via interface input circuit 71 and stores these signals within RAM 74.

In step S85a of FIG. 3, CPU 72 initiates engine start-up routines as known in the art. Atmospheric air pressure ambient to engine 10 is a required variable for the execution of some of the engine start-up routines. In step S85b of FIG. 3, CPU 72 therefore concurrently computes atmospheric air pressure signal $AAP_S$ and stores atmospheric air pressure signal $AAP_S$ within RAM 74. Atmospheric air pressure signal $AAP_S$ is a function of absolute boost pressure signal $ABP_S$. In the preferred embodiment of the present invention, atmospheric air pressure signal $AAP_S$ is computed during step S85b in accordance with the following equation (1):

$$AAP_S = ABP_S \tag{1}$$

After execution of the engine start-up routines, CPU 72 pauses until CPU 72 receives engine ON signal $EO_S$ in step S86 of FIG. 3. In step S87a of FIG. 3, CPU 72 initiates engine control routines as known in the art. Atmospheric air pressure ambient to engine 10 is a required variable for the execution of some of the engine control routines. In step S87b of FIG. 3, CPU 72 therefore concurrently initiates atmospheric air pressure estimation routine 90 to thereby compute the atmospheric air pressure ambient to engine 10 for the applicable engine control routines.

Figure 4:
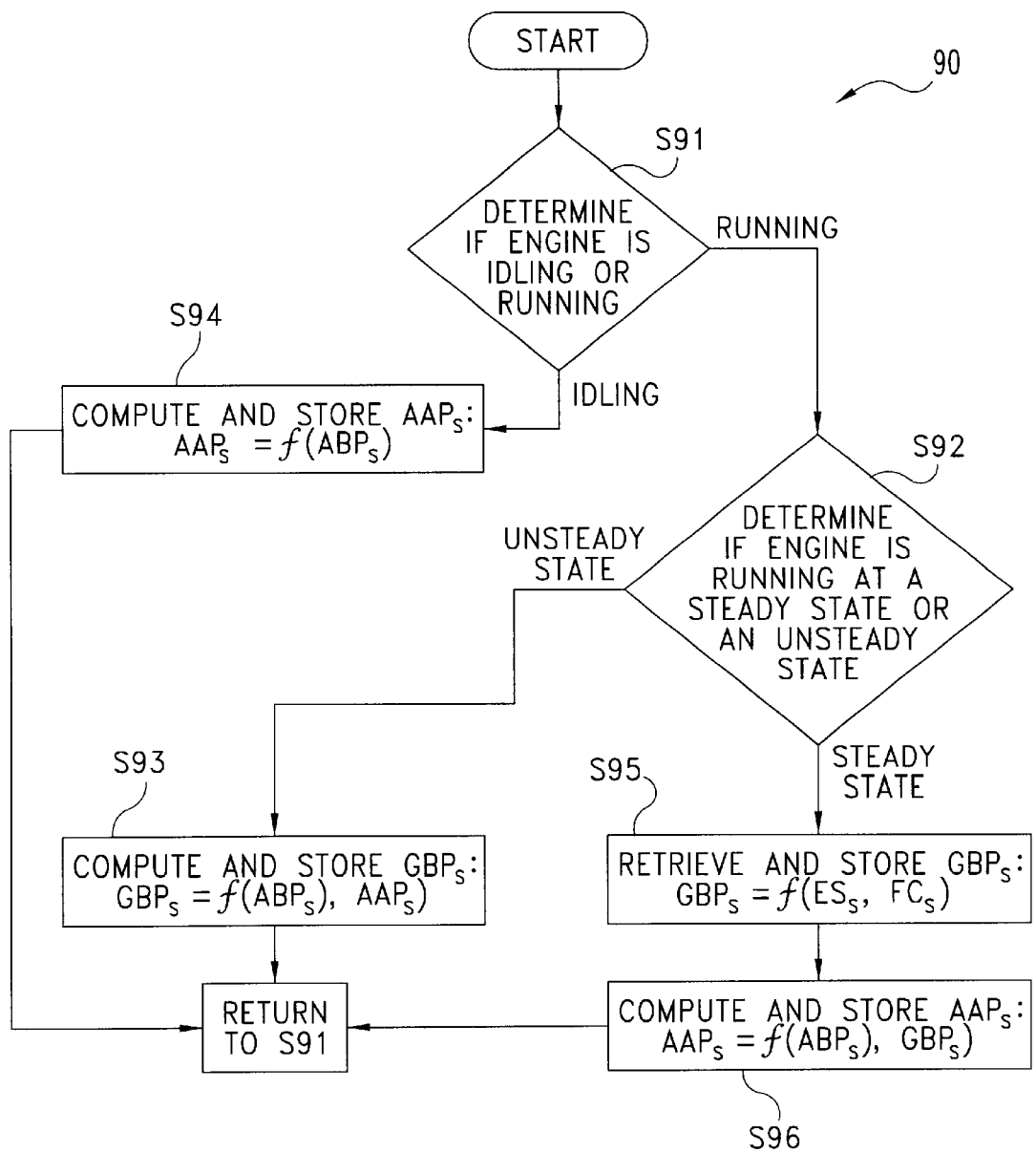
FIG. 4 is a flow chart illustrating one embodiment of an atmospheric air pressure estimation routine in accordance with the present invention for the FIGS. 1 and 2 electronic control unit.

Referring to FIG. 4, an execution of atmospheric air pressure estimation routine 90 by CPU 72 will now be described. The present invention contemplates that atmospheric air pressure estimation routine 90 is executed at least once by CPU 72 for each combustion cycle of engine 10. In step S91 of FIG. 4, CPU 72 determines, as well known in the art, if engine 10 is idling or running. If CPU 72 determines engine 10 is running in step S91, as is the case when engine 10 is first started, then CPU 72 determines if engine 10 is running in a steady state or in an unsteady state. The present invention contemplates that the determination of whether engine 10 is running in a steady state or in an unsteady state can be accomplished in accordance with the general practice of the present invention, e.g. a monitoring of engine speed, etc. In the preferred embodiment of the present invention, a steady state of engine 10 is defined as an absolute boost pressure of engine 10 being steady over a chosen number of clock cycles of CPU 72 or a chosen number of combustion cycles of engine 10, and an unsteady state of engine 10 is defined as the absolute boost pressure of engine 10 being unsteady over the chosen number of clock cycles of CPU 72 or the chosen number of combustion cycles of engine 10. The present invention contemplates that steady state parameters and unsteady state parameters for the absolute boost pressure of engine 10 can be established in accordance with the general practice of the present invention based on desired performance levels of engine 10. In the preferred embodiment of the present invention, CPU 72 computes the absolute difference between a current level of absolute boost pressure signal $ABP_S$ and an average level of absolute boost pressure signal $ABP_S$ over the previous x number of clock cycles of CPU 72 or x number of combustion cycles of engine 10. CPU 72 determines engine 10 to be running in a steady state when the absolute difference is equal to or less than a specified threshold, and determines engine 10 to be running in an unsteady state when the absolute difference is greater than the specified threshold. The x number of clock cycles of CPU 72 or the x number of combustion cycles of engine 10 as well as the specified threshold are selected based on a desired precision in estimating the atmospheric air pressure ambient to engine 10. An example of this computation will be described in greater detail in connection with FIG. 6.

When CPU 72 determines engine 10 is running in an unsteady state, as is the case when engine 10 is first started as indicated by engine ON signal $EO_S$, then CPU 72 computes a gage boost pressure signal $GBP_S$ of engine 10 as a function of atmospheric air pressure signal $AAP_S$ and absolute boost pressure signal $ABP_S$, in step S93. In a preferred embodiment of the present invention, gage boost pressure signal $GBP_S$ is computed during step S93 in accordance with the following equation (2):

$$GBP_S = ABP_S - AAP_S \tag{2}$$

CPU 72 returns to step S91 upon the completed computation and storage of gage boost pressure signal $GBP_S$. CPU 72 concurrently executes one of the applicable engine control routines requiring atmospheric air pressure signal $AAP_S$ and/or gage boost pressure signal $GBP_S$ as a variable. In particular, CPU 72 executes an engine control routine as known in the art for providing fuel command signal $FC_S$ as a function of many variables including gage boost pressure signal $GBP_S$ on a sporadic basis. Steps S91, S92, and S93 are sequentially repeated therefrom as engine 10 is being started.

Upon engine 10 being started, CPU 72 now determines if engine 10 is idling or running in step S91 of FIG. 4. If CPU 72 determines that engine 10 is idling, then CPU 72 computes atmospheric air pressure signal $AAP_S$ and stores atmospheric air pressure signal $AAP_S$ within RAM 74 in step S94 of FIG. 4. Atmospheric air pressure signal $AAP_S$ is again a function of absolute boost pressure signal $ABP_S$. In the preferred embodiment of the present invention, atmospheric air pressure signal $AAP_S$ is computed during step S94 in accordance with the equation (1):

$$AAP_S = ABP_S \tag{1}$$

CPU 72 returns to step S91 upon completion of step S94. Steps S91 and S94 are sequentially repeated therefrom as engine 10 continually idles.

Figure 5:
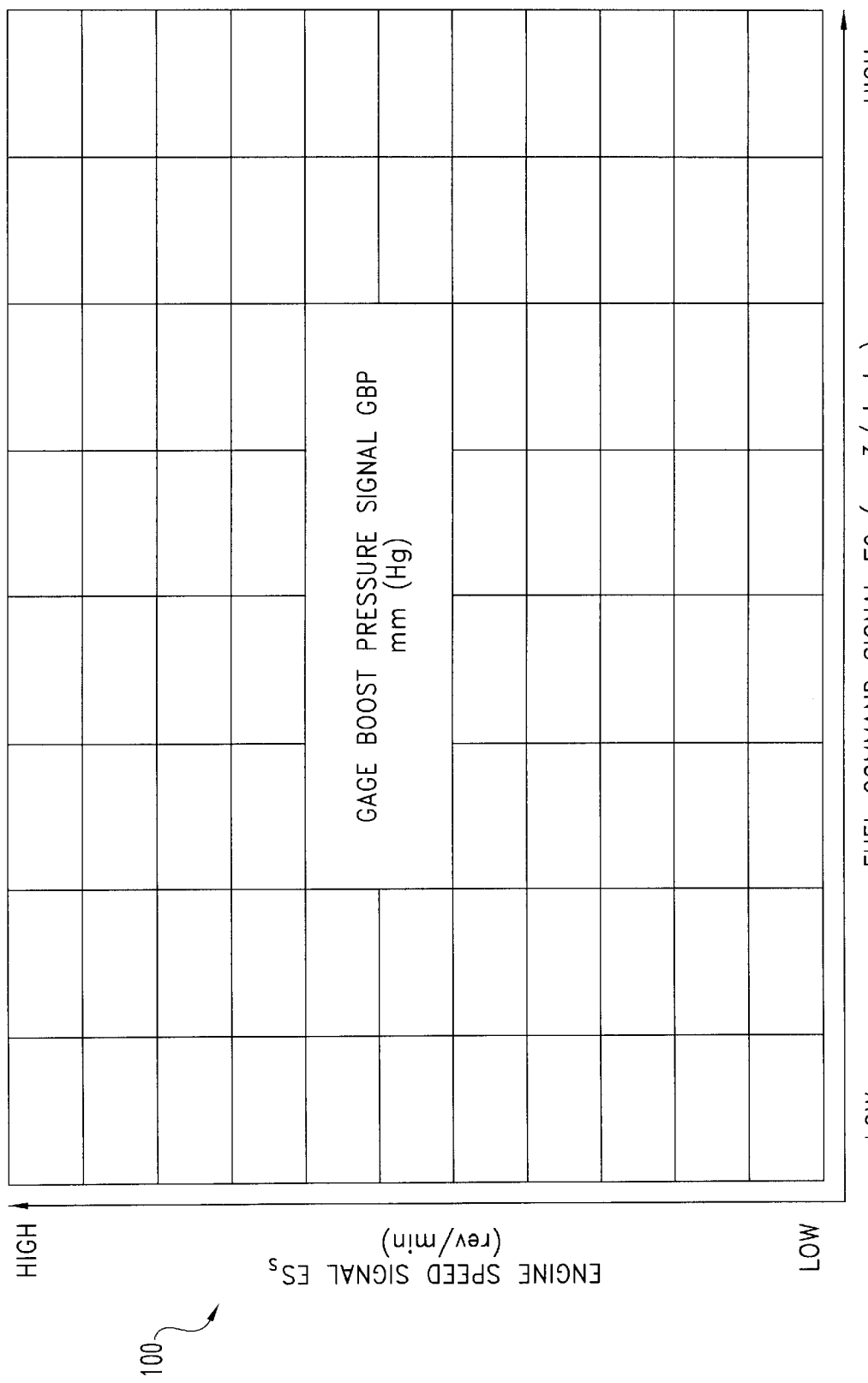
FIG. 5 is a view of a map of estimated gage boost pressure signals in correlation with an engine speed signal and a fueling command signal.

If CPU 72 determines that engine 10 is transitioning from idling to running in step S91, then CPU 72 determines if engine 10 is running in a steady state or in an unsteady state in step S92 as previously described herein. When CPU 72 determines engine 10 is running in an unsteady state, CPU 72 executes step S93 as previously described herein. Steps S91, S92, and S93 are sequentially repeated therefrom as engine 10 continually runs in an unsteady state. When CPU 72 determines engine 10 is running in a steady state, CPU 72 computes gage boost pressure signal $GBP_S$ as a function of engine speed signal $ES_S$ and fuel command signal $FC_S$ in step S95 of FIG. 4. In the preferred embodiment of the present invention, a map of gage boost pressure signal $GBP_S$ as correlated to engine speed signal $ES_S$ and fuel command signal $FC_S$ is stored within ROM 73, and the appropriate value for gage boost pressure signal $GBP_S$ is retrieved therefrom by CPU 72 and stored in RAM 74. An example of such a map is map 100 as shown in FIG. 5. Referring to FIG. 5, map 100 has fuel command signal $FC_S$ taken along the abscissa (x axis) and engine speed signal $ES_S$ taken along the ordinate (y axis). It is to be appreciated that for any given fuel command signal $FC_S$, gage boost pressure signal $GBP_S$ increases as engine speed signal $ES_S$ increases Likewise, for any given engine speed signal $ES_S$, gage boost pressure signal $GBP_S$ increases as fuel command signal $FC_S$ increases.

Referring back to FIG. 4, in step S96, CPU 72 computes atmospheric air pressure signal $AAP_S$ as a function of absolute boost pressure signal $ABP_S$ and gage boost pressure signal $GBP_S$, and stores atmospheric air pressure signal $AAP_S$ within RAM 74. In one embodiment of the present invention, atmospheric air pressure signal $AAP_S$ is computed during step S96 in accordance with the following equation (3):

$$AAP_S = ABP_S - GBP_S \tag{3}$$

CPU 72 returns to step S91 upon the completed computation and execution of atmospheric air pressure signal $AAP_S$. CPU 72 concurrently executes one of the applicable engine control routines requiring atmospheric air pressure signal $AAP_S$ and/or gage boost pressure signal $GBP_S$ as a variable. In particular, CPU 72 executes an engine control routine as known in the art for providing fuel command signal $FC_S$ as a function of many variables including gage boost pressure signal $GBP_S$ on a sporadic basis. Steps S91, S92, S95, and S96 are sequentially repeated as engine 10 is continually running in a steady state.

In a second embodiment of the present invention, atmospheric air pressure signal $AAP_S$ is computed during step S96 in accordance with the following equations (4) and (5):

$$GBP_S + AAP_S = ABP_S \tag{4}$$

$$GBP_S + AAP_S < ABP_S \tag{5}$$

If CPU 72 determines that equation (4) is true, then CPU 72 returns to step S91. If CPU 72 determines that equation (4) is false, then CPU 72 determines if equation (5) is true, and if so, then CPU 72 will increment atmospheric air pressure signal $AAP_S$ as stored in RAM 74 until equation (4) is true and return to step S91 upon completion. If CPU 72 determines that equation (5) is false, then CPU 72 will decrement atmospheric air pressure signal $AAP_S$ as stored in RAM 74 until equation (4) is true and return to step S91 upon completion.

Figure 6:
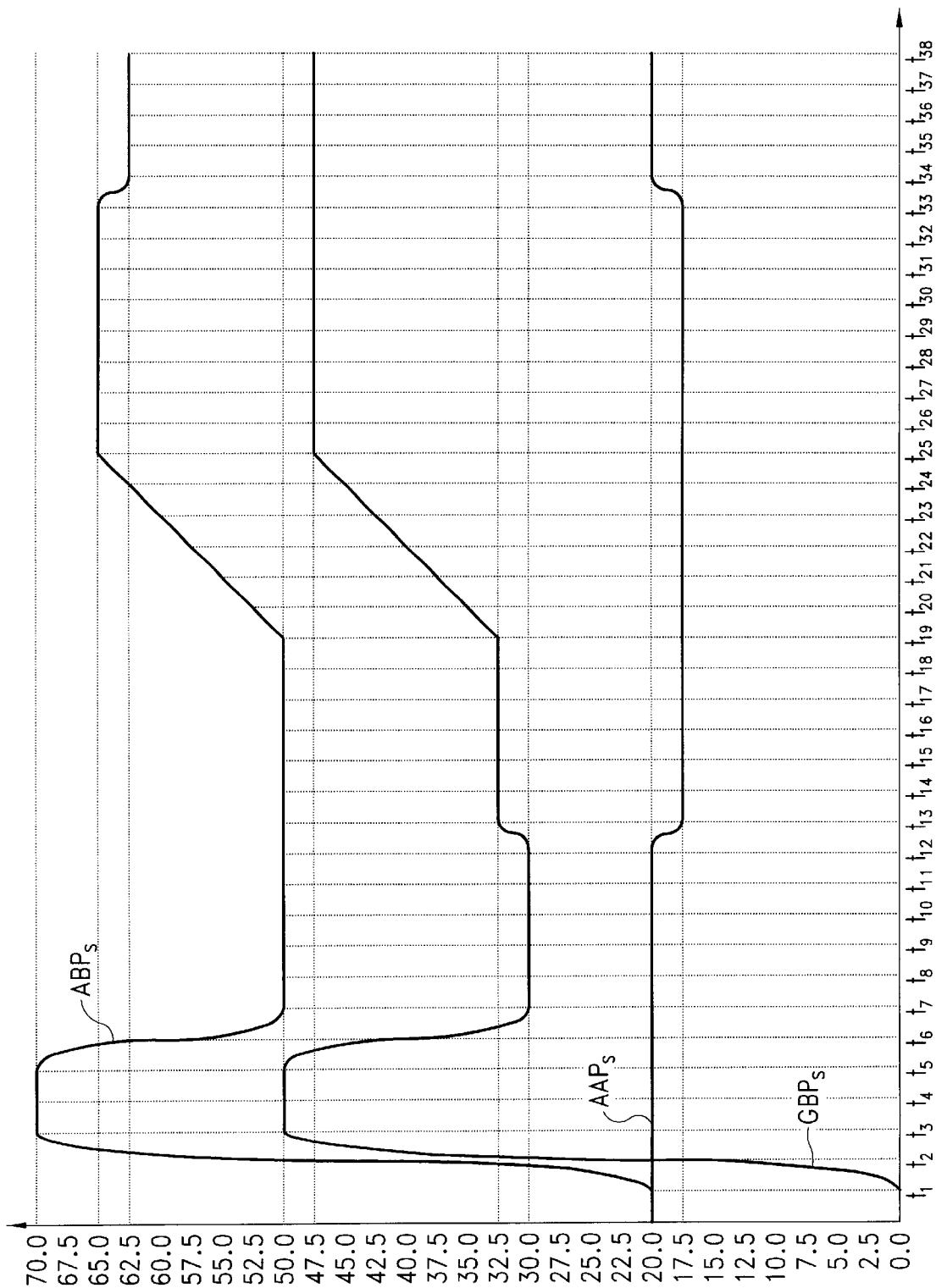
FIG. 6 is an graph illustrating an exemplary execution of the FIG. 3 engine operation routine and the FIG. 4 atmospheric air pressure estimation routine.

Referring to FIG. 6, a graphical illustration of an exemplary computation of both atmospheric air pressure signal $AAP_S$ and gage boost pressure signal $GBP_S$ will now be described. It is to be appreciated during this exemplary description that atmospheric air pressure signal $AAP_S$ and gage boost pressure signal $GBP_S$ are computed at least one for each of combustion cycle of engine 10. As a result, CPU 72 is able to generate fuel command signal $FC_S$ as a function of gage boost pressure signal $GBP_S$ when required whereby a significant degree of an optimal quantity of fuel is injected into one of the combustion chambers 12 for each combustion cycle of engine 10. An idling state of engine 10 is shown along the abscissa (x axis) of the graph for the time period prior to combustion cycle $t_1$, and a running state of engine 10 is shown along the abscissa (x axis) of the graph from the time period between combustion cycles $t_1$ to $t_{38}$. Mercury levels for atmospheric air pressure signal $AAP_S$, absolute boost pressure signal $ABP_S$, and gage boost pressure signal $GBP_S$ are shown along the ordinate (y axis) of the graph. During the idling state of engine 10, absolute boost pressure signal $ABP_S$ is 20 mm Hg and gage boost pressure signal $GBP_S$ is 0.0 mm Hg. From step S92 of FIG. 4, atmospheric air pressure signal $AAP_S$ is computed in accordance with equation (1). As a result, atmospheric air pressure signal $AAP_S$ is 20.0 mm Hg.

From combustion cycle $t_1$ to combustion cycle $t_9$, engine 10 is running in an unsteady state as the absolute boost pressure increases from 20.0 mm Hg to 70.0 mm Hg and then decreases to 50.0 mm Hg. Specifically, from combustion cycle $t_1$ to combustion cycle $t_3$, the absolute difference between the current level of absolute boost pressure signal $ABP_S$ for each combustion cycle and an average level of absolute boost pressure signal $ABP_S$ over the three previous clock cycles of CPU 72 exceeds a specified threshold of 2.5 mm Hg. The utilization of the three previous clock cycles and the specified threshold of 2.5 mm Hg is strictly for this exemplary description, and therefore the present invention is not limited to such a utilization. It is to be appreciated that, in view of the desired precision in computing atmospheric air pressure signal $AAP_S$ and gage boost pressure signal $GBP_S$, any number of clock cycles can be selected during the averaging of absolute boost pressure signal $ABP_S$ as engine 10 transitions from idling to running, and the specified threshold can be selected for any level. From combustion cycle $t_4$ to combustion cycle $t_9$, the absolute difference between the current level of absolute boost pressure signal $ABP_S$ for each combustion cycle and an average level of absolute boost pressure signal $ABP_S$ over the three previous combustion cycles exceeds the specified threshold of 2.5 mm Hg. The utilization of the three previous combustion cycles is strictly for this exemplary description, and therefore the present invention is not limited to such a utilization. It is to be appreciated that, in view of the desired precision in computing atmospheric air pressure signal $AAP_S$ and gage boost pressure signal $GBP_S$, any number of combustion cycles can be selected during the averaging of absolute boost pressure signal $ABP_S$. It is also to be appreciated that any number of clock cycles of CPU 72 can alternatively be used. From step S92 of FIG. 4, atmospheric air pressure signal $AAP_S$ is 20.0 mm Hg as stored in RAM 73. From step S93 of FIG. 4, gage boost pressure signal $GBP_S$ is computed in accordance with equation (2). As a result, boost pressure signal $GBP_S$ increases from 0.0 mm Hg to 50.0 mm Hg and then decreases to 30.0 mm Hg. It is to be appreciated that any change in gage boost pressure signal $GBP_S$ is therefore a direct reflection of any change in absolute boost pressure signal $ABP_S$.

From combustion cycle $t_{10}$ to combustion cycle $t_{19}$, engine 10 is running in a steady state. Specifically, the absolute difference between the current level of absolute boost pressure signal $ABP_S$ and an average level of absolute boost pressure signal $ABP_S$ over the three previous combustion cycles is either equal to or less than the specified threshold of 2.5 mm Hg. For steps S94 and S95 of FIG. 4, gage boost pressure signal $GBP_S$ is computed from map 100 of FIG. 6, and atmospheric air pressure signal $AAP_S$ is computed in accordance with equation (3), respectively. From combustion cycle $t_{10}$ to combustion cycle $t_{19}$, absolute boost pressure signal $ABP_S$ is 50.0 mm Hg, and gage boost pressure signal $GBP_S$ is 30.0 mm Hg. As a result, atmospheric air pressure signal $AAP_S$ is 20.0 mm Hg. From combustion cycle $t_{13}$ to combustion cycle $t_{19}$, absolute boost pressure signal $ABP_S$ is still 50.0 mm Hg and gage boost pressure signal $GBP_S$ increases from 30.0 mm Hg to 32.5 mm Hg as computed from map 100 of FIG. 6. As a result, atmospheric air pressure signal $AAP_S$ decreases from 20.0 mm Hg to 17.5 mm Hg.

From combustion cycle $t_{20}$ to combustion cycle $t_{25}$, engine 10 is running in an unsteady state as absolute boost pressure signal $ABP_S$ increases from 50.0 mm Hg to 65.0 mm Hg. Specifically, the absolute difference between the current level of absolute boost pressure signal $ABP_S$ for each combustion cycle and an average level of absolute boost pressure signal $ABP_S$ over the three previous combustion cycles exceeds the specified threshold of 2.5 mm Hg. From step S95 of FIG. 4, atmospheric air pressure signal $AAP_S$ is 17.5 mm Hg as stored in RAM 73. From step S93 of FIG. 4, gage boost pressure signal $GBP_S$ is again computed in accordance with equation (2). As a result, boost pressure signal $GBP_S$ increases from 32.5 mm Hg to 47.5 mm Hg.

From combustion cycle $t_{26}$ to combustion cycle $t_{38}$, engine 10 is running in a steady state. Specifically, the absolute difference between the current level of absolute boost pressure signal $ABP_S$ and an average level of absolute boost pressure signal $ABP_S$ over the three previous combustion cycles is either equal to or less than the specified threshold of 2.5 mm Hg. It is to be appreciated that absolute boost pressure signal $ABP_S$ decreases from 62.5 mm Hg to 60.0 mm Hg at combustion cycle $t_{34}$, but engine 10 is still deemed to be running in a steady state. For steps S94 and S95 of FIG. 4, gage boost pressure signal $GBP_S$ is computed from map 100 of FIG. 6, and atmospheric air pressure signal $AAP_S$ is computed in accordance with equation (3), respectively. Gage boost pressure signal $GBP_S$ is 47.5 mm Hg from combustion cycle $t_{26}$ to combustion cycle $t_{38}$. Atmospheric air pressure signal $AAP_S$ is 17.5 mm Hg from combustion cycle $t_{26}$ to combustion cycle $t_{33}$, and then increases from 17.5 mm Hg to 20.0 mm Hg from combustion cycle $t_{34}$ to combustion cycle $t_{38}$ due to the increase in absolute boost pressure signal $ABP_S$.

Figure 7:
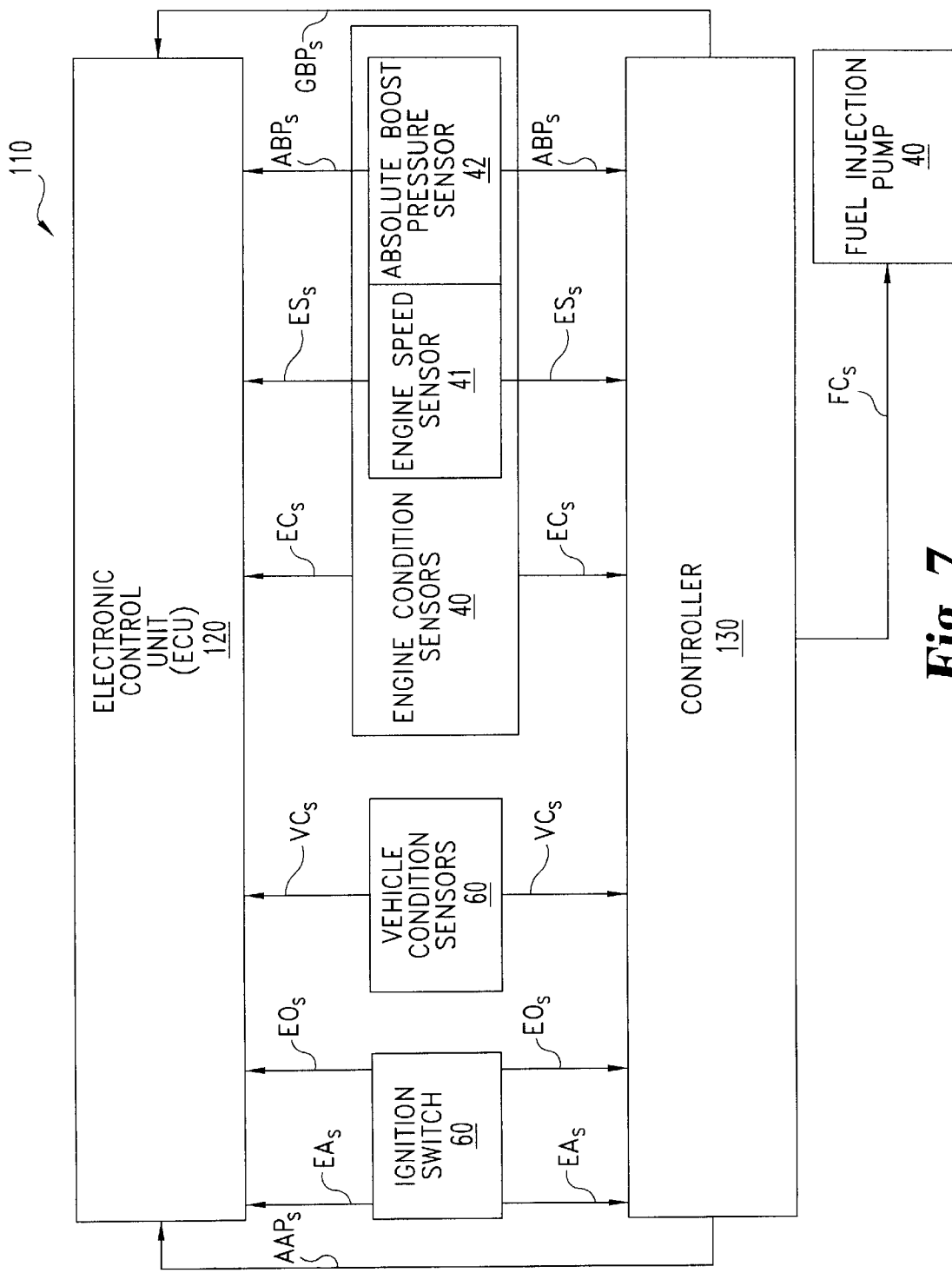
FIG. 7 is a diagrammatic illustration of alternative embodiment of a system for dynamically estimating atmospheric air pressure ambient to an internal combustion engine in accordance with the present invention.

Referring to FIG. 7, a second embodiment of a system 110 for executing a method for dynamically estimating atmospheric air pressure ambient to engine 10 for each combustion cycle of engine 10 in accordance with the present invention is shown. System 110 primarily comprises engine condition sensors 40 including engine speed sensor 41 and absolute boost pressure sensor 42, vehicle condition sensors 50, ignition switch 60, an electronic control unit 120 (hereinafter "ECU 120"), and controller 130. Engine condition sensors 40, engine speed sensor 41, absolute boost pressure sensor 42, vehicle condition sensors 50, and ignition switch 60 have been previously described in connection with FIG. 1. ECU 120 executes an engine operation routine 140 as will be described in greater detail in connection with FIG. 8. The present invention contemplates that ECU 120 can include digital circuitry, analog circuitry, or both. Preferably, the structural configuration of ECU 120 parallels the structural configuration of ECU 70 as described in connection with FIG. 2. Controller 130 executes an atmospheric air pressure estimation routine 150 as will be described in greater detail in FIG. 9. The present invention contemplates that controller 130 can include digital circuitry, analog circuitry, or both. Preferably, the structural configuration of controller 130 is analogous with the structural configuration of ECU 70 as described in connection with FIG. 2. One skilled in the art will recognize operable structural configurations for ECU 120 and controller 130 based on the description of engine operation routine 140 and atmospheric air pressure estimation routine 150, respectively.

Figure 8:
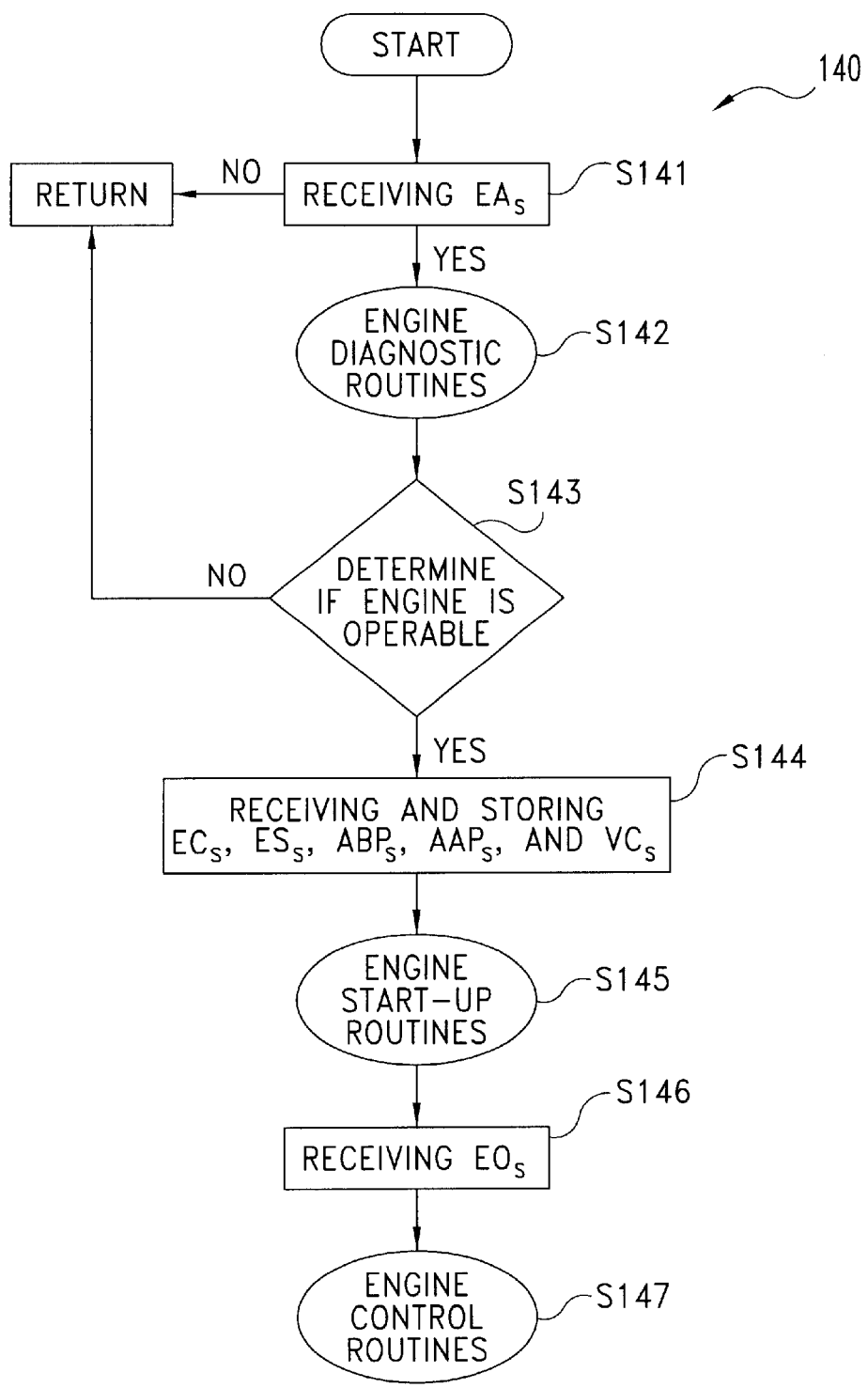
FIG. 8 is a flow chart illustrating one embodiment of an engine operation routine in accordance with the present invention for the electronic control unit of the FIG. 7 system.

Referring to FIG. 8, an execution of engine operation routine 140 by ECU 120 will now be described. In step S141 of FIG. 8, ECU 120 receives engine activation signal $EA_S$. The remaining steps of engine operation routine 140 are sequentially executed therefrom during the time interval that ECU 120 receives engine activation signal $EA_S$. Thus, engine operation routine 140 terminates upon a cessation of ECU 120 receiving engine activation signal $EA_S$. In step S142 of FIG. 8, ECU 120 initiates engine diagnostic routines as known in the art. In step S143 of FIG. 8, ECU 120 determines if engine 10 is capable of being started and operated based upon the immediate and continued results of the engine diagnostic routines. If the collective results of the engine diagnostic routines are ever negative during the receipt of engine activation signal $EA_S$, ECU 120 will terminate engine operation routine 140. If the collective results of the engine diagnostic routines are always positive during the receipt of engine activation signal $EA_S$, ECU 120 proceeds to the remaining steps of engine operation routine 140. In step S144 of FIG. 8, for each clock cycle of ECU 120 thereon, ECU 120 receives engine condition signals $EC_S$, engine speed signal $ES_S$, absolute boost pressure signal $ABP_S$, atmospheric air pressure signal $AAP_S$, and vehicle condition signals $VC_S$. Atmospheric air pressure signal $AAP_S$ and gage boost pressure signal $GBP_S$ is provided to ECU 120 by controller 130 as will be described in connection with FIG. 9.

Still referring to FIG. 8, in step S145, ECU 120 initiates engine start-up routines as known in the art. After execution of the engine start-up routines, ECU 120 pauses until ECU 120 receives engine ON signal $EO_S$ in step S146 of FIG. 8. In step S147 of FIG. 8, ECU 120 initiates engine control routines as known in the art. As compared to ECU 70, ECU 120 does not initiate atmospheric air pressure estimation routine 90. Instead, controller 130 executes atmospheric air pressure estimation routine 150 to thereby eliminate a computation and memory space allocation burden that ECU 120 would endure if ECU 120 was executing atmospheric air pressure estimation routine 90.

Figure 9:
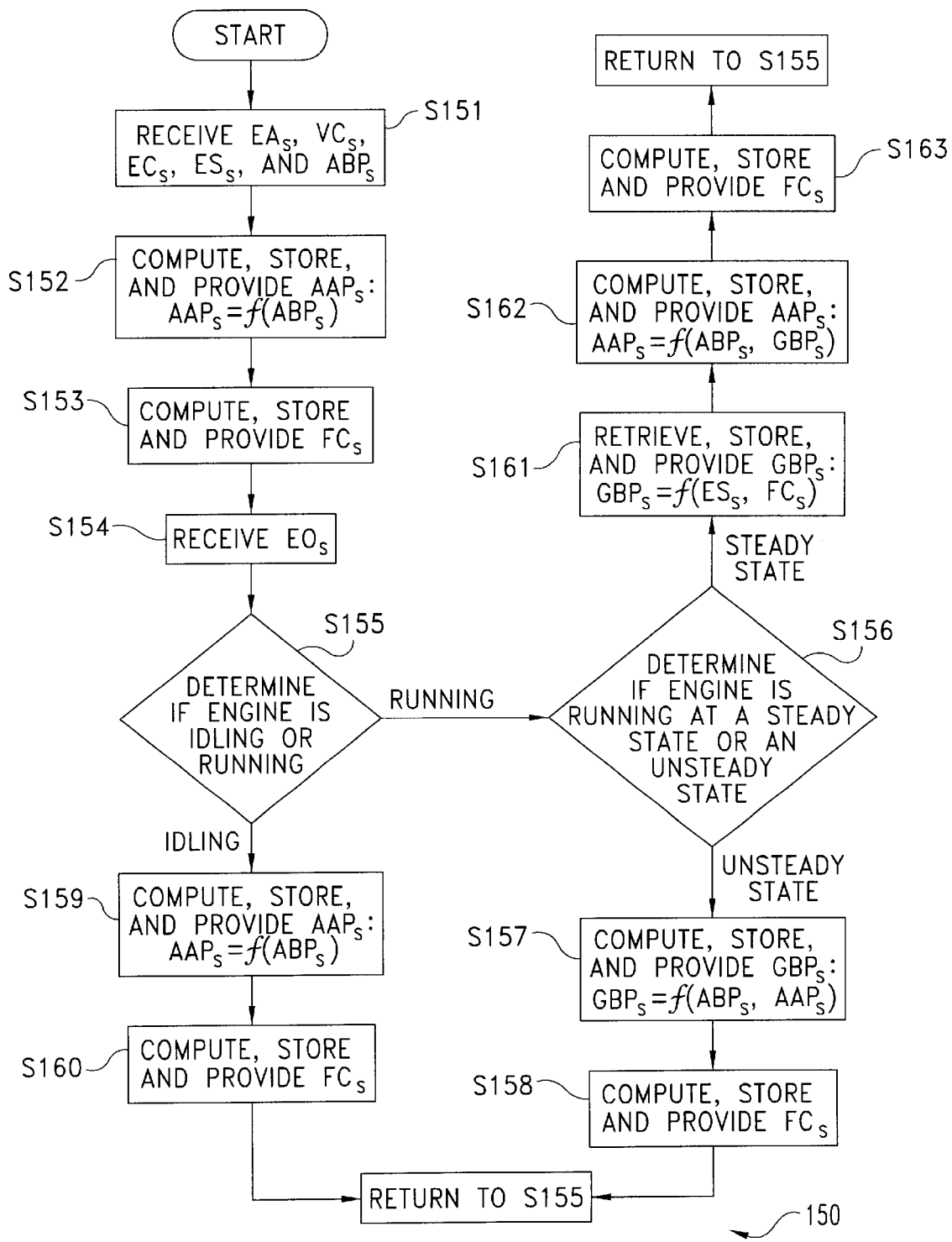
FIG. 9 is a flow chart illustrating one embodiment of an atmospheric air pressure estimation routine in accordance with the present invention for the controller of the FIG. 7 system.

Referring to FIG. 9, an execution of atmospheric air pressure estimation routine 150 by controller 130 will now be described. The present invention contemplates that atmospheric air pressure estimation routine 150 is executed at least once by controller 130 for each combustion cycle of engine 10. In step S151 of FIG. 9, for each clock cycle of controller 130 thereon, controller 130 receives engine activation signal $EA_S$, vehicle condition signals $VC_S$, engine condition signals $EC_S$, engine speed signal $ES_S$, and absolute boost pressure signal $ABP_S$. The remaining steps of atmospheric air pressure estimation routine 150 are executed therefrom during the time interval that controller 130 receives engine activation signal $EA_S$. Thus, atmospheric air pressure estimation routine 150 terminates upon a cessation of controller 130 receiving engine activation signal $EA_S$. Alternatively, ECU 120 can provide a signal to controller 130 that mirrors engine activation signal $EA_S$. In step S152 of FIG. 9, controller 130 computes atmospheric air pressure signal $AAP_S$ as a function of absolute boost pressure signal $ABP_S$. In the preferred embodiment of the present invention, atmospheric air pressure signal $AAP_S$ is computed during step S152 in accordance with equation (1):

$$AAP_S = ABP_S \quad (1)$$

Controller 130 then provides the computed atmospheric air pressure signal $AAP_S$ to ECU 120. In step S153 of FIG. 9, controller 130 computes fuel command signal $FC_S$ as well known in the art and provides fuel command signal $FC_S$ to fuel injection pump 14 as shown in FIG. 7. It is to be appreciated that the computation of atmospheric air pressure signal $AAP_S$ in step S152 enables controller 130 to generate fuel command signal $FC_S$ as a function of atmospheric air pressure signal $AAP_S$ whereby a significant degree of an optimal quantity of fuel is injected into combustion chambers 12 of engine 10 as engine 10 is being started. After computing fuel command signal $FC_S$, controller 130 pauses until controller 130 receives engine ON signal $EO_S$ as shown in FIG. 7, or receives a comparable signal from ECU 120.

In step S155 of FIG. 9, controller 130 determines, as well known in the art, if engine 10 is idling or running. If controller 130 determines engine 10 is running in step S155, as is the case when engine 10 is first started, then controller 130 determines if engine 10 is running in a steady state or in an unsteady state in step S156 as previously described in connection with step S92 of FIG. 4. When controller 130 determines engine 10 is running in an unsteady state, as is the case when engine 10 is first started, then controller 130 computes a gage boost pressure signal $GBP_S$ of engine 10 as a function of atmospheric air pressure signal $AAP_S$ and absolute boost pressure signal $ABP_S$ in step S157. In a preferred embodiment of the present invention, gage boost pressure signal $GBP_S$ is computed during step S157 in accordance with equation (2):

$$GBP_S = ABP_S - AAP_S \quad (2)$$

Controller 130 then provides the computed gage boost pressure signal $GBP_S$ to ECU 120. In step S158 of FIG. 9, controller 130 again computes fuel command signal $FC_S$ as well known in the art and provides fuel command signal $FC_S$ to fuel injection pump 14. It is to be appreciated that the computation of gage boost pressure signal $GBP_S$ in step S158 enables controller 130 to generate fuel command signal $FC_S$ as a function gage boost pressure signal $GBP_S$ when required whereby a significant degree of an optimal quantity of fuel is injected into one of the combustion chambers 12 of engine 10 as engine 10 is being started. Steps S155, S156, S157, and S158 are sequentially repeated as engine 10 is being started.

Upon engine 10 being started, controller 130 now determines if engine 10 is idling or running in step S155. If controller 130 determines engine 10 is idling, then controller 130 again computes and provides atmospheric air pressure signal $AAP_S$ as a function of absolute boost pressure signal $ABP_S$ in step S159 of FIG. 9. Controller 130 then computes and provides fuel command signal $FC_S$ as well known in the art in step S160 and provides fuel command signal $FC_S$ to fuel injection pump 14. It is to be appreciated that the computation of atmospheric air pressure signal $AAP_S$ in step S152 enables controller 130 to generate fuel command signal $FC_S$ as a function of atmospheric air pressure signal $AAP_S$ when required whereby a significant degree of an optimal quantity of fuel is injected into combustion chambers 12 of engine 10 when engine 10 transitions from idling to running. Steps S155, S159, and S160 are sequentially repeated as engine 10 is continually idling.

If controller 130 determines that engine 10 is running in step S155, then controller 130 determines if engine 10 is running in a steady state or in an unsteady state in step S156. When controller 130 determines engine 10 is running in an unsteady state, then controller 130 executes steps S157 and S158 as previously described herein, and sequentially repeats steps S155, S156, S157, and S158 as engine 10 continually run in an unsteady state. When controller 130 determines engine 10 is running in a steady state, controller 130 computes gage boost pressure signal $GBP_S$ as a function of engine speed signal $ES_S$ and fuel command signal $FC_S$ in step S161 of FIG. 9. In the preferred embodiment of the present invention, a map of gage boost pressure signal $GBP_S$ as correlated to engine speed signal $ES_S$ and fuel command signal $FC_S$ is stored within controller 130, and the appropriate value for gage boost pressure signal $GBP_S$ is retrieved therefrom by controller 130 and provided to ECU 120. An example of such a map is map 100 as shown in FIG. 5.

Referring back to FIG. 9, in step S162, controller 130 computes atmospheric air pressure signal $AAP_S$ as a function of absolute boost pressure signal $ABP_S$ and gage boost pressure signal $GBP_S$, and provides atmospheric air pressure signal $AAP_S$ to ECU 120. In one embodiment of the present invention, atmospheric air pressure signal $AAP_S$ is computed during step S162 in accordance with equation (3):

$$AAP_S = ABP_S - GBP_S \quad (3)$$

In step S163 of FIG. 9, controller 130 again computes fuel command signal $FC_S$ as well known in the art and provides fuel command signal $FC_S$ to fuel injection pump 14. It is to be appreciated that the computation of gage boost pressure signal $GBP_S$ in step S163 enables controller 130 to generate fuel command signal $FC_S$ as a function gage boost pressure signal $GBP_S$ when required whereby a significant degree of an optimal quantity of fuel is injected into one of the combustion chambers 12 of engine 10 as engine 10 is being started. Steps S155, S156, S161, S162, and S163 are sequentially repeated as engine 10 is continually running in a steady state.

In a second embodiment of the present invention, atmospheric air pressure signal $AAP_S$ is computed during step S162 in accordance with equations (4) and (5)

$$GBP_S + AAP_S = ABP_S \quad (4)$$

$$GBP_S + AAP_S < ABP_S \quad (5)$$

If controller 130 determines that equation (4) is true, then controller 130 goes to step S163. If controller 130 determines that equation (4) is false, then controller 130 determines if equation (5) is true, and if so, then controller 130 will increment atmospheric air pressure signal $AAP_S$ until equation (4) is true and go to step S163 upon completion. If controller 130 determine equation (5) is false, then controller 130 will decrement atmospheric air pressure signal $AAP_S$ until equation (4) is true and go to step S163 upon completion.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of estimating atmospheric air pressure ambient to an internal combustion engine, said method comprising the steps of:
   (a) estimating the atmospheric air pressure as a function of an absolute boost pressure of the internal combustion engine when the internal combustion engine is idling; and
   (b) estimating the atmospheric air pressure as a function of said absolute boost pressure and an engine speed of the internal combustion engine when the internal combustion engine is running in a steady state.

2. The method of claim 1, which further includes sensing the absolute boost pressure, and wherein said step (b) includes computing a gage boost pressure value as a function of the engine speed and a fuel command valve, and further wherein said step (b) includes computing the atmospheric air pressure as a function of the sensed absolute boost pressure and the gage boost pressure valve.

3. The method of claim 2, which further includes retrieving the gage boost pressure valve from a data set including gage boost pressure valves correlated to engine speed valves and fuel command valves.

4. The method of claim 3, wherein the data set is defined by a map.

5. The method of claim 3, which further includes repeating step (b) for each combustion cycle of the engine.

6. A method of estimating atmospheric air pressure ambient to an internal combustion engine, said method comprising the acts of:
   (a) sensing an absolute boost pressure of the internal combustion engine when the internal combustion engine is idling;
   (b) computing an estimated value of the atmospheric air pressure as a function of said absolute boost pressure as sensed in step (a);
   (c) sensing an absolute boost pressure of the internal combustion engine when the internal combustion engine is running in an unsteady state; and
   (d) computing an estimated value of a gage boost pressure signal of the internal combustion engine as a function of said estimated value of the atmospheric air pressure as computed in step (b) and of said absolute boost pressure as sensed in step (c).

7. The method of claim 6 further comprising the act of:
   (e) sequentially repeating steps (c) and (d) as the internal combustion is continually running in an unsteady state.

8. The method of claim 6 wherein steps (c) and (d) are performed at least once for each combustion cycle of the internal combustion engine when the internal combustion engine is running in an unsteady state.

9. The method of claim 6 further comprising the act of:
   (e) computing a fuel command for the internal combustion engine as a function of said estimated value of said gage boost pressure signal as computed in step (d).

10. The method of claim 9 further comprising the act of:
    (f) sequentially repeating steps (c), (d), and (e) as the internal combustion is continually running in an unsteady state.

11. The method of claim 9 wherein steps (c), (d), and (e) are performed at least once for each combustion cycle of the internal combustion engine when the internal combustion engine is running in an unsteady state.

12. The method of claim 9 further comprising the acts of:
    (e) sensing an absolute boost pressure of the internal combustion engine when the internal combustion engine is running in a steady state;
    (f) sensing an engine speed of the internal combustion engine when the internal combustion engine is running in a steady state;
    (g) computing said estimated value of said gage boost pressure signal as a function of said fuel command as computed in step (d) and said engine speed as sensed in step (f); and
    (h) computing said estimated value of the atmospheric air pressure as a function of said absolute boost pressure as sensed in step (e) and of said estimated value of said gage boost pressure signal as computed in step (g).

13. The method of claim 12 further comprising the step of:
    (i) sequentially repeating steps (e), (f), (g), and (h) as the internal combustion engine is continually running in a steady state.

14. The method of claim 12 wherein steps (e), (f), (g), and (h) are performed at least once for each combustion cycle of the internal combustion engine when the internal combustion engine is running in a steady state.

15. The method of claim 12 further comprising the act of:
    (i) computing a fuel command for the internal combustion engine.

16. The method of claim 15 further comprising the act of:
    (j) sequentially repeating steps (e), (f), (g), (h), and (i) as the internal combustion is continually running in a steady state.

17. The method of claim 15 wherein steps (e), (f), (g), (h), and (i) are performed at least once for each combustion cycle of the internal combustion engine when the internal combustion engine is running in a steady state.

18. A system for estimating atmospheric air pressure ambient to an internal combustion engine, said system comprising:

first means for estimating the atmospheric air pressure as a function of an absolute boost pressure of the internal combustion engine when the internal combustion engine is idling; and second means for estimating the atmospheric air pressure as a function of said absolute boost pressure and the engine speed of the internal combustion engine when the internal combustion engine is running in a steady state.

19. A system for estimating atmospheric air pressure ambient to an internal combustion engine, said system comprising:

a first sensor providing a first signal indicative of an absolute boost pressure of the internal combustion engine; and an electronic control unit receiving said first signal, said electronic control unit constructed and arranged to generate a second signal as a function of said first signal when the internal combustion engine is idling, said second signal being indicative of the atmospheric air pressure, wherein said electronic control unit is further constructed and arranged to generate a third signal as a function of said first signal and said second signal when the internal combustion engine is running in an unsteady state, said third signal being indicative of a gage boost pressure of the internal combustion engine.

20. The system of claim 19 wherein said electronic control unit is further constructed and arranged to generate a fourth signal when the internal combustion engine is running in an unsteady state, said fourth signal being indicative of a fuel command for the internal combustion engine.

21. The system of claim 20 further comprising a second sensor providing a fifth signal indicative of an engine speed of the internal combustion engine.

22. The system of claim 21 wherein said electronic control unit is further constructed and arranged to generate said third signal as a function of said fourth signal and said fifth signal when the internal combustion engine is running in a steady state.

23. The system of claim 22 wherein said electronic control unit is further constructed and arranged to generate said second signal as a function of said first signal and said third signal when the internal combustion engine is running in a steady state.

24. The system of claim 23 wherein said electronic control unit is further constructed and arranged to generate said fourth signal as a function of said third signal when the internal combustion engine is running in a steady state.

25. A system for estimating atmospheric air pressure ambient to an internal combustion engine, said system comprising:

a first sensor providing a first signal indicative of an absolute boost pressure of the internal combustion engine; and a controller receiving said first signal, said controller constructed and arranged to generate a second signal as a function of said first signal when the internal combustion engine is idling, said second signal being indicative of the atmospheric air pressure, wherein said controller is further constructed and arranged to generate a third signal as a function of said first signal and said second signal when the internal combustion engine is running in an unsteady state, said third signal being indicative of a gage boost pressure of the internal combustion engine.

26. The system of claim 25 further comprising an electronic control unit, wherein said controller provides said second signal and said electronic control unit receives said second signal.

27. The system of claim 26, wherein said controller provides said third signal and said electronic control unit receives said third signal.

28. The system of claim 27 wherein said controller is constructed and arranged to generate a fourth signal when the internal combustion engine is running in an unsteady state, said fourth signal being indicative of a fuel command for the internal combustion engine.

29. The system of claim 28 further comprising a second sensor providing a fifth signal indicative of an engine speed of the internal combustion engine.

30. The system of claim 29 wherein said controller is further constructed and arranged to generate said third signal as a function of said fourth signal and said fifth signal when the internal combustion engine is running in a steady state.

31. The system of claim 30 wherein said controller is further constructed and arranged to generate said second signal as a function of said first signal and said third signal when the internal combustion engine is running in a steady state.

32. The system of claim 31 wherein said controller is further constructed and arranged to generate said fourth signal as a function of said third signal when the internal combustion engine is running in a steady state.

33. A method of estimating atmospheric air pressure ambient to an internal combustion engine, comprising:

sensing an air pressure within an intake manifold of the internal combustion engine, the air pressure within the intake manifold defines an absolute boost pressure signal;

computing an estimated value of a gage boost pressure signal as a function of an internal combustion engine speed signal and a fuel command signal; and computing an atmospheric air pressure signal ambient to the internal combustion engine as a function of the absolute boost pressure signal and the gage boost pressure signal.

34. The method of claim 33, which further includes determining that the internal combustion engine is running at a steady state.

35. The method of claim 33, wherein said computing an estimated value of the gage boost pressure signal includes retrieving the estimated value from a data set of gage boost pressure signals as correlated to internal combustion engine speed signals and fuel command signals.

36. The method of claim 35, which further includes providing the data set in a map format.

37. The method of claim 33, wherein said computing acts are performed at least once for each combustion cycle of the internal combustion engine.

* * * * *